US011994431B2

(12) United States Patent
Lin et al.

(10) Patent No.: US 11,994,431 B2
(45) Date of Patent: May 28, 2024

(54) OMNIDIRECTIONAL MEASUREMENT SYSTEM FOR TIME-VARYING CHARACTERISTIC OF ATMOSPHERIC VAPOR RADIATION

(71) Applicant: Purple Mountain Observatory, Chinese Academy of Sciences, Nanjing (CN)

(72) Inventors: Zhenhui Lin, Nanjing (CN); Qijun Yao, Nanjing (CN); Dong Liu, Nanjing (CN); Jie Liu, Nanjing (CN); Wenying Duan, Nanjing (CN); Shengcai Shi, Nanjing (CN)

(73) Assignee: Purple Mountain Observatory, Chinese Academy of Sciences, Nanjing (CN)

( * ) Notice: Subject to any disclaimer, the term of this patent is extended or adjusted under 35 U.S.C. 154(b) by 0 days.

(21) Appl. No.: 18/385,414

(22) Filed: Oct. 31, 2023

(65) Prior Publication Data

US 2024/0060825 A1 Feb. 22, 2024

Related U.S. Application Data

(63) Continuation of application No. PCT/CN2023/094668, filed on May 17, 2023.

(30) Foreign Application Priority Data

Jul. 29, 2022 (CN) .......................... 202210902664.1

(51) Int. Cl.
*G01N 21/3504* (2014.01)
*G01J 5/00* (2022.01)
(Continued)

(52) U.S. Cl.
CPC ............. *G01J 5/804* (2022.01); *G01J 5/0014* (2013.01); *G01J 5/53* (2022.01); *G01J 5/54* (2013.01);
(Continued)

(58) Field of Classification Search
CPC .. G01J 5/804; G01J 5/0014; G01J 5/53; G01J 5/54; G01J 5/806; G01J 2005/208;
(Continued)

(56) References Cited

U.S. PATENT DOCUMENTS

| 4,873,481 A | 10/1989 | Nelson et al. |
| 5,999,121 A | 12/1999 | Salonen |

(Continued)

FOREIGN PATENT DOCUMENTS

| CN | 102243304 A | 11/2011 |
| CN | 104713641 A | 6/2015 |

(Continued)

*Primary Examiner* — Freddie Kirkland, III
(74) *Attorney, Agent, or Firm* — Bayramoglu Law Offices LLC (57) ABSTRACT

An omnidirectional measurement system for a time-varying characteristic of atmospheric vapor radiation includes an antenna and calibrator assembly, a receiver assembly, a room temperature IF assembly, and a data acquisition and system control assembly. Atmospheric vapor features a wide profile and strong radiation in a frequency band of 183 GHz, and is often seen in the characteristic measurement of atmospheric vapor in high-altitude areas. The omnidirectional measurement system combines a superconductor-insulator-superconductor (SIS) mixer with high detection sensitivity in the frequency band of 183 GHz with a structure that integrates pitch scanning, omnidirectional scanning, and automatic calibration to achieve fast and high-precision omnidirectional scanning measurement of the time-varying characteristic of atmospheric vapor radiation. The omnidirectional measurement system has a pitch adjustment-based (Continued)

fast omnidirectional scanning function, and can measure the time-varying characteristic of atmospheric vapor radiation with higher precision and higher temporal resolution through the SIS mixer with higher sensitivity.

6 Claims, 3 Drawing Sheets

(51) Int. Cl.
  *G01J 5/53* (2022.01)
  *G01J 5/54* (2006.01)
  *G01J 5/80* (2022.01)
  *G01J 5/20* (2006.01)
  *G01N 21/3586* (2014.01)
  *G01W 1/06* (2006.01)

(52) U.S. Cl.
  CPC ......... *G01J 5/806* (2022.01); *G01J 2005/208* (2013.01); *G01N 21/3504* (2013.01); *G01N 21/3586* (2013.01); *G01W 1/06* (2013.01)

(58) Field of Classification Search
  CPC ........... G01N 21/3504; G01N 21/3586; G01N 21/3581; G01W 1/06; Y02A 90/10
  See application file for complete search history.

(56) References Cited

U.S. PATENT DOCUMENTS

| | | | |
|---|---|---|---|
| 2011/0218734 A1 | | 9/2011 | Solheim |
| 2021/0181173 A1* | | 6/2021 | Pequignot .............. G01N 15/06 |

FOREIGN PATENT DOCUMENTS

| | | |
|---|---|---|
| CN | 104793216 A | 7/2015 |
| CN | 105988115 A | 10/2016 |
| CN | 106813779 A | 6/2017 |
| CN | 107449965 A | 12/2017 |
| CN | 108195792 A | 6/2018 |
| CN | 113203480 A | 8/2021 |
| CN | 113295284 A | 8/2021 |
| CN | 115308159 A | 11/2022 |

\* cited by examiner

OMNIDIRECTIONAL MEASUREMENT SYSTEM FOR TIME-VARYING CHARACTERISTIC OF ATMOSPHERIC VAPOR RADIATION

CROSS REFERENCE TO THE RELATED APPLICATIONS

This application is the continuation application of International Application No. PCT/CN2023/094668, filed on May 17, 2023, which is based upon and claims priority to Chinese Patent Application No. 202210902664.1, filed on Jul. 29, 2022, the entire contents of which are incorporated herein by reference.

TECHNICAL FIELD

The present disclosure relates to the technical field of terahertz (THz)-band atmospheric measurement, and in particular to an omnidirectional measurement system for a time-varying characteristic of atmospheric vapor radiation.

BACKGROUND

The terahertz (THz) band is loosely defined as a frequency range of 0.1-10 THz, overlapping with some millimeter and sub-millimeter waves. It features strong molecular absorption and dispersion, low photon energy, etc., and has important application prospects in fields such as astronomy and atmospheric science.

The strong absorption of THz waves by the atmosphere, especially atmospheric vapor, leads to severe attenuation and sharp weakening of the signal pathway. Due to the fact that atmospheric vapor is in an unsaturated state and is the only substance that exists in three states, the distribution of the atmospheric vapor in time and space is very uneven. As a result, the THz waves transmitted in the atmosphere are seriously affected in time and space, thereby leading to a significant decrease in the effective detection efficiency of astronomical signals (such as very weak cosmic microwave background (CMB) B-mode polarization signals) in the THz band. In the application of weak astronomical signals, it is necessary to address the impact of the atmosphere on detection. Therefore, quantitative monitoring of the atmosphere, especially precipitable water vapor (PWV), has become an important task.

At present, there are various technical means, including wireless radiosondes, global positioning system (GPS) meteorology, and radiometers or Fourier transform spectrometers, for direct or indirect measurement of PWV. In recent years, systematic PWV data are acquired based on satellites' meteorological data and atmospheric reanalysis data or are evaluated based on regional characteristics of atmospheric vapors. The radiosonde measures the meteorological element of the atmosphere that varies with altitude so as to directly measure the vertical distribution of the meteorological element. The radiosonde has been regarded as a standard PWV measurement device for many years. However, it has limited detection frequency (usually twice a day) and low temporal resolution, making it hard to invert the short-term characteristic change of the atmospheric vapor or to measure the change characteristic of the atmospheric vapor at a certain observation direction. The ground-based GPS meteorology measures PWV according to the principle that atmospheric vapor causes a delay in the transmission of a GPS signal. It has a high temporal resolution in PWV measurement, about several tens of minutes, but has a low measurement accuracy of about 1-2 mm, far less than that (on the order of 0.1 mm) required by THz astronomical stations, which limits its application in the characteristic measurement of the atmospheric vapor. Traditional radiometers are used to measure zenith atmospheric opacity and derive zenith PWV through a model of the relationship between the atmospheric opacity and PWV at a specific frequency. Due to the high detection sensitivity, the radiometer can achieve high-precision PWV measurement, with measurement accuracy above 0.1 mm and high temporal resolution (up to the order of 10 min). Therefore, radiometers are often used for measuring PWV at high-altitude stations. Fourier transform spectrometers, similar to radiometers, are considered as radiometers with wider operating frequency bands. The Fourier transform spectrometers indirectly measure PWV by measuring broadband atmospheric transmittance. Similarly, Fourier transform spectrometers have high detection sensitivity and a temporal resolution comparable to that of radiometers. Satellites' meteorological data and atmospheric reanalysis data usually include PWV data, and thus have global or regional coverage capabilities, and can provide systematic data. Therefore, they are increasingly used for regional PWV assessment. However, limited by low temporal and spatial resolutions, satellites' meteorological data and atmospheric reanalysis data can hardly measure the short-term (such as on the order of less than 10 min) change characteristic of PWV.

The above PWV measurement techniques can achieve zenith atmospheric vapor measurement. In terms of temporal resolution and measurement accuracy, traditional radiometers and Fourier transform spectrometers have advantages in high temporal resolution (on the order of 10 min) and high measurement accuracy (on the order of 0.1 mm). Traditional radiometers generally require pitch scanning to achieve atmospheric opacity measurement, while Fourier transform spectrometers require a scanning moving mirror to achieve signal interference reception. These working methods currently take about 10 min to achieve a complete PWV measurement in the zenith direction, making it hard to meet the requirement for fast measuring the time-varying characteristic of atmospheric vapor radiation in a shorter time (on the order of less than 10 min) and in more observation areas (such as omnidirectional within 3600).

SUMMARY

To overcome the shortcomings of the prior art, the present disclosure provides an omnidirectional measurement system for a time-varying characteristic of atmospheric vapor radiation. The present disclosure solves the problems mentioned in the background, that is, the existing methods are hard to fast measure the time-varying characteristic of atmospheric vapor radiation in a shorter time and in more observation areas.

To achieve the above objective, the present disclosure adopts following technical solution:

The omnidirectional measurement system for a time-varying characteristic of atmospheric vapor radiation includes an antenna and calibrator assembly, a receiver assembly, a room temperature intermediate-frequency (IF) assembly, and a data acquisition and system control assembly, where the antenna and calibrator assembly includes a platform: a bottom surface of the platform is provided with an omnidirectional rotating mechanism AzR, and a top surface of the platform is provided with a pitch scanning metal mirror M1, a first turning metal mirror M2, a second turning metal mirror M3, and a calibration unit; the omnidirectional rotating mechanism AzR is configured to rotate the entire platform, such that the pitch scanning metal mirror M1 receives atmospheric signals within different ranges; and a connection relationship between the components located on the top surface of the platform is as follows: the pitch scanning metal mirror M1 adjusts a pitch angle through a hydraulic mechanism, and receives and reflects the atmospheric signal to the first turning metal mirror M2, and the first turning metal mirror M2 adjusts a turning angle through a hydraulic mechanism, and receives and reflects the atmospheric signal reflected by the pitch scanning metal mirror M1 to the second turning metal mirror M3;

the calibration unit is configured to calibrate a radiation temperature of the input atmospheric signal; the calibration unit includes a three-phase chopper wheel C, a first high-temperature blackbody calibration source H1 and a second high-temperature blackbody calibration source H2 that are located between reflection paths of the first turning metal mirror M2 and the second turning metal mirror M3; the three-phase chopper wheel C periodically rotates to periodically release the atmospheric signal reflected by the first turning metal mirror M2 to the second turning metal mirror M3, periodically reflect a signal emitted by the first high-temperature blackbody calibration source H1 to the second turning metal mirror M3, and periodically reflect a signal emitted by the second high-temperature blackbody calibration source H2 to the second turning metal mirror M3; and the second turning metal mirror M3 reflects the received atmospheric signal, the signal emitted by the first high-temperature blackbody calibration source H1, and the signal emitted by the second high-temperature blackbody calibration source H2 to the receiver assembly;

the receiver assembly is configured to process each signal reflected by the second turning metal mirror M3, including mixing the signal to an intermediate frequency and performing an ultra-wideband low-noise amplification to output an ultra-wideband IF signal;

the room temperature IF assembly is configured to process the ultra-wideband IF signal output by the receiver assembly, including splitting the ultra-wideband IF signal into multiple channels, and performing filtering, detection, and a direct-current (DC) amplification at different bandwidths to form and output multiple DC detection signals, thereby completing a characteristic measurement of atmospheric vapor radiation; and the data acquisition and system control assembly is configured to acquire the signals output by the room temperature IF assembly, and coordinate and control various components in the antenna and calibrator assembly, the receiver assembly and the room temperature IF assembly.

To optimize the above technical solution, the present disclosure further takes the following specific measures.

Further, the three-phase chopper wheel C specifically includes a main rectangular plate; two ends of the main rectangular plate are respectively fixedly provided with two fan-shaped blades; the two fan-shaped blades are provided with a conical male section and a conical female section, respectively, where the conical male section is provided with a convex surface, and the conical female section is provided with a concave surface.

Further, specifically, the three-phase chopper wheel C periodically rotates to periodically release the atmospheric signal reflected by the first turning metal mirror M2 to the second turning metal mirror M3, periodically reflect the signal emitted by the first high-temperature blackbody calibration source H1 to the second turning metal mirror M3, and periodically reflect the signal emitted by the second high-temperature blackbody calibration source H2 to the second turning metal mirror M3 as follows:

the main rectangular plate in the three-phase chopper wheel C rotates around a center point; when the main rectangular plate rotates to shelter the atmospheric signal reflected by the first turning metal mirror M2, the fan-shaped blades provided at the ends of the main rectangular plate correspondingly rotate to designated positions, and the first high-temperature blackbody calibration source H1 and the second high-temperature blackbody calibration source H2 emit signals; if the fan-shaped blade shows the conical male section, the signal emitted by the first high-temperature blackbody calibration source H1 is adapted with a fitting angle of the conical male section, and is successfully reflected to the second turning metal mirror M3, while the signal emitted by the second high-temperature blackbody calibration source H2 is not adapted with the fitting angle of the conical male section, and is not reflected to the second turning metal mirror M3; if the fan-shaped blade shows the conical female section, the signal emitted by the second high-temperature blackbody calibration source H2 is adapted with a fitting angle of the conical female section, and is successfully reflected to the second turning metal mirror M3, while the signal emitted by the first high-temperature blackbody calibration source H1 is not adapted with the fitting angle of the conical female section, and is not reflected to the second turning metal mirror M3;

when the main rectangular plate rotates to not shelter the atmospheric signal reflected by the first turning metal mirror M2, the fan-shaped blades provided at the ends of the main rectangular plate detach from the designated positions, and the signals emitted by the first high-temperature blackbody calibration source H1 and the second high-temperature blackbody calibration source H2 are not reflected to the second turning metal mirror M3; and in this way, the three-phase chopper wheel C rotates periodically, so as to periodically release the atmospheric signal reflected by the first turning metal mirror M2 to the second turning metal mirror M3, periodically reflect the signal emitted by the first high-temperature blackbody calibration source H1 to the second turning metal mirror M3, and periodically reflect the signal emitted by the second high-temperature blackbody calibration source H2 to the second turning metal mirror M3.

Further, the receiver assembly includes a superconductor-insulator-superconductor (SIS) mixer, a low-noise amplifier (LNA), a local oscillator, and a 4K Dewar; the SIS mixer and the LNA are located in a low-temperature vacuum environment provided by the 4K Dewar; the local oscillator uses a microwave reference source as a reference source, and generates a millimeter wave reference source in a certain frequency band through multiple frequency multiplication amplifications; the SIS mixer is configured to mix the signal transmitted by the second turning metal mirror M3 with the local oscillator in the frequency band to generate an IF signal; and the IF signal is amplified by the LNA at a low temperature and output to the room temperature IF assembly.

Further, the room temperature IF assembly includes a power splitter and four IF processing units with different center frequency and bandwidth combinations; the IF processing unit includes a band pass filter, a detector, and a DC amplifier; the power splitter is configured to receive the signal output by the LNA and split the signal into four signals, through power averaging, to the IF processing units; and the band pass filter, the detector and the DC amplifier inside each of the IF processing units sequentially process the input signal to finally form four DC voltage signals to complete the characteristic measurement of atmospheric vapor radiation, and the four DC voltage signals are output to the data acquisition and system control assembly.

Further, the data acquisition and system control assembly includes a data acquisitor composed of four highly dynamic analog-to-digital converter (ADC) chips and an embedded controller; each of the ADC chips is correspondingly connected to one IF processing unit to acquire and convert data information processed by each IF processing unit, for subsequent analysis by the embedded controller; and the embedded controller is further configured to adjust parameters of various system devices, including a pitch scanning angle of the pitch scanning metal mirror M1, a reflection angle of the first turning metal mirror M2, a reflection angle of the second turning metal mirror M3, chopping start/stop and a chopping rate of the three-phase chopper wheel C, start and an omnidirectional scanning rate of the omnidirectional rotating mechanism AzR, a frequency and power of the local oscillator, a bias of the SIS mixer, a bias of the LNA, refrigeration start of the 4K Dewar, and start/stop of four-channel data acquisition.

The present disclosure has the following beneficial effects. The present disclosure adopts a scanning calibration mechanism with a pitch scanning function (the pitch scanning metal mirror M1), an omnidirectional scanning function, and a dual-temperature-scale self-calibration function (the omnidirectional rotating mechanism AzR, the three-phase chopper wheel C, the first high-temperature blackbody calibration source H1, and the second high-temperature blackbody calibration source H2). The present disclosure combines the SIS mixer with ultra-high sensitivity for ultra-wideband reception and processing, achieving fast (on the order of less than 10 min) omnidirectional (360°) characteristic measurement of atmospheric vapor radiation in the 183 GHz frequency band. Meanwhile, the present disclosure separates the mechanism with the pitch scanning, omnidirectional scanning, and dual-temperature-scale self-calibration functions from other assemblies of the system (including the receiver assembly, the room temperature IF assembly, and the data acquisition and system control assembly) according to dynamic and static states. The design reduces the operating load of the antenna and calibrator assembly, avoids mechanical operation of the non-operating assembly, and improves the stability of the overall mechanical and electrical characteristics of the system.

DETAILED DESCRIPTION OF THE EMBODIMENTS

The present disclosure will be described in further detail below in combination with the drawings.

An overall technical solution of the present disclosure is as follows.

An omnidirectional measurement system for a time-varying characteristic of atmospheric vapor radiation includes an antenna and calibrator assembly, a receiver assembly, a room temperature IF assembly, and a data acquisition and system control assembly.

In the antenna and calibrator assembly, an optical path of an atmospheric signal (i.e. atmospheric vapor signal) at a certain pitch angle is adjusted vertically downwards for omnidirectional scanning, through a pitch rotating mechanism (a hydraulic mechanism) of pitch scanning metal mirror M1, omnidirectional rotating mechanism AzR, and three turning mirrors (pitch scanning metal mirror M1, first turning metal mirror M2, and second turning metal mirror M3). Meanwhile, the antenna and calibrator assembly is provided with a three-phase chopper mechanism (three-phase chopper wheel C) and a dual-temperature-scale blackbody calibration source (first high-temperature blackbody calibration source H1 and second high-temperature blackbody calibration source H2) to achieve self-calibration of an atmospheric radiation characteristic. The design integrates antenna scanning and self-calibration.

The receiver assembly receives and mixes a signal output by the antenna and calibrator assembly with a local oscillator to an intermediate frequency, and performs ultra-wideband low-noise amplification to output an ultra-wideband IF signal.

The room temperature IF assembly splits the ultra-wideband IF signal output by the receiver assembly into four signals, and performs filtering, detection, and DC amplification with different bandwidths to form and output four DC detection signals.

The data acquisition and system control assembly performs highly dynamic data acquisition and storage on the four DC detection signals output by the room temperature IF assembly. The data acquisition and system control assembly further sets and controls the pitch scanning and azimuth scanning of the antenna and calibrator assembly, start/stop and a chopping rate of the three-phase chopper wheel C, a frequency and power of the local oscillator in the receiver assembly, a bias of a SIS mixer, a bias of a LNA, refrigeration start of a 4K Dewar, and start/stop of data acquisition by the data acquisition and system control assembly.

Further, the antenna and calibrator assembly is separated from other assemblies of the system (including the receiver assembly, the room temperature IF assembly, and the data acquisition and system control assembly) to ensure the dynamic and static separation of rotating and electrical structures, thereby improving the mechanical and electrical stability of the system during overall operation.

The antenna and calibrator assembly is provided with the three-phase chopper wheel. The chopper wheel achieves chopping switching of an atmospheric signal, a signal emitted by the first high-temperature blackbody calibration source H1, the atmospheric signal, and a signal emitted by the second high-temperature blackbody calibration source H2 in one chopping cycle. The design greatly simplifies the volume of the calibration mechanism while achieving dual-temperature-scale self-calibration.

The receiver assembly uses the SIS mixer to achieve high-sensitivity detection of the atmospheric signal, improving measurement accuracy and shortening the integral time for effective atmospheric detection, thereby greatly improving the omnidirectional scanning rate.

Further, the antenna and calibrator assembly includes the pitch scanning metal mirror M1, the first turning metal mirror M2, the second turning metal mirror M3, the three-phase chopper wheel C, the two actively heated sources including the first high-temperature blackbody calibration source H1 and the second high-temperature blackbody calibration source H2, and the omnidirectional rotating mechanism AzR for 3600 omnidirectional scanning.

Further, the receiver assembly includes the SIS mixer, the local oscillator, the LNA, and the 4K Dewar.

Further, the room temperature IF assembly includes a power splitter and four IF processing units with different center frequency and bandwidth combinations.

Further, the data acquisition and system control assembly includes a data acquisitor, an embedded controller, and application software.

The present disclosure is described through a specific embodiment below.

Figure 1:
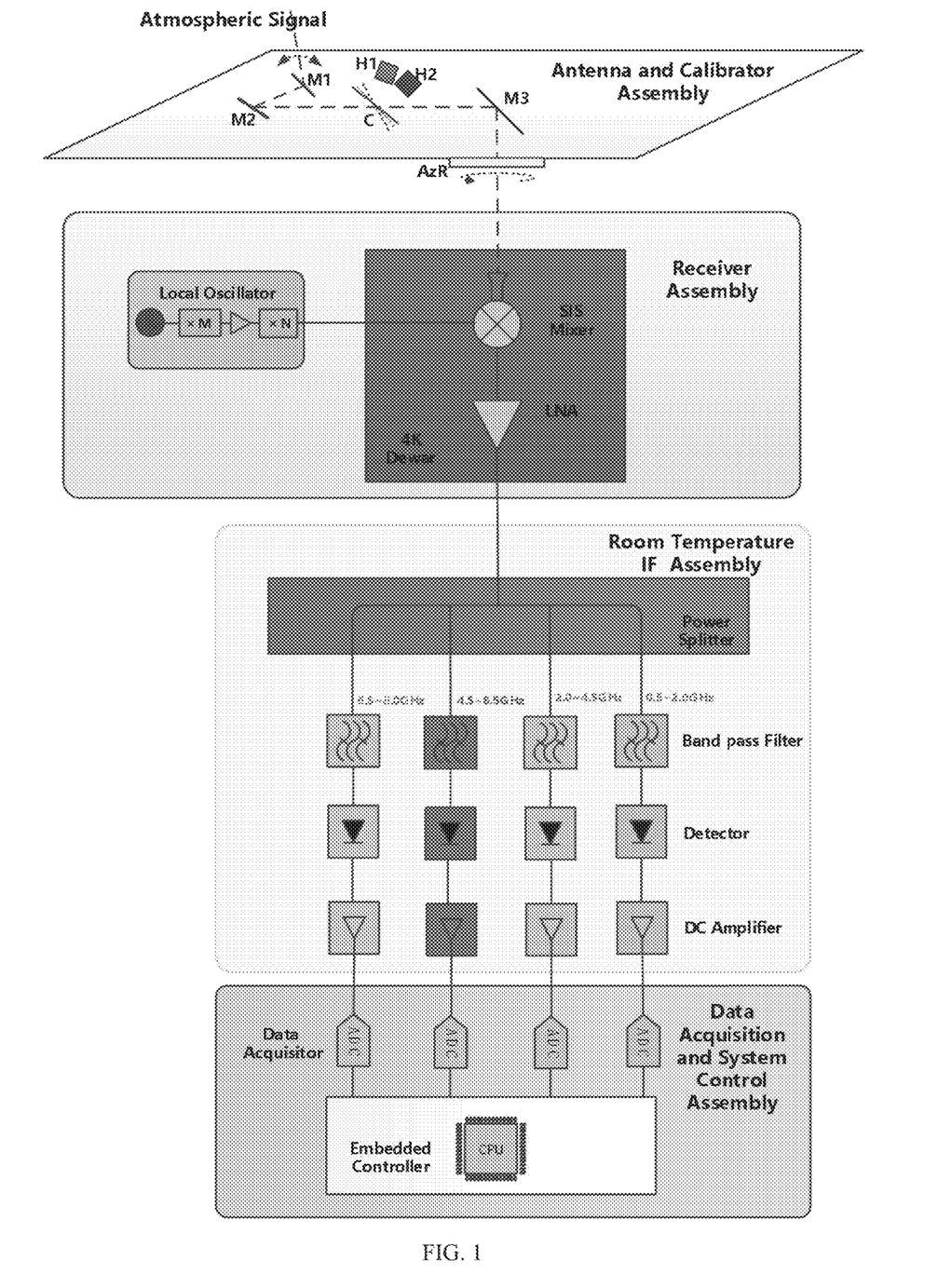
FIG. 1 is a structural diagram of an omnidirectional measurement system for a time-varying characteristic of atmospheric vapor radiation according to the present disclosure.

As shown in FIG. 1, the omnidirectional measurement system for a time-varying characteristic of atmospheric vapor radiation includes an antenna and calibrator assembly, a receiver assembly, a room temperature IF assembly, and a data acquisition and system control assembly.

Figure 2:
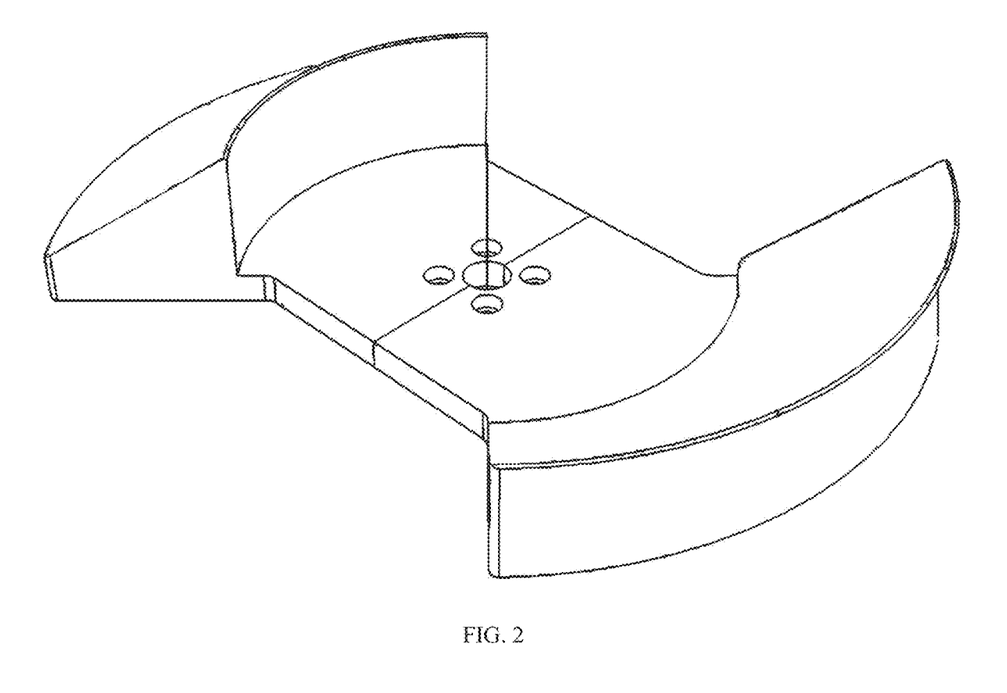
FIG. 2 is a structural diagram of a three-phase chopper wheel C according to the present disclosure.
Figure 3:
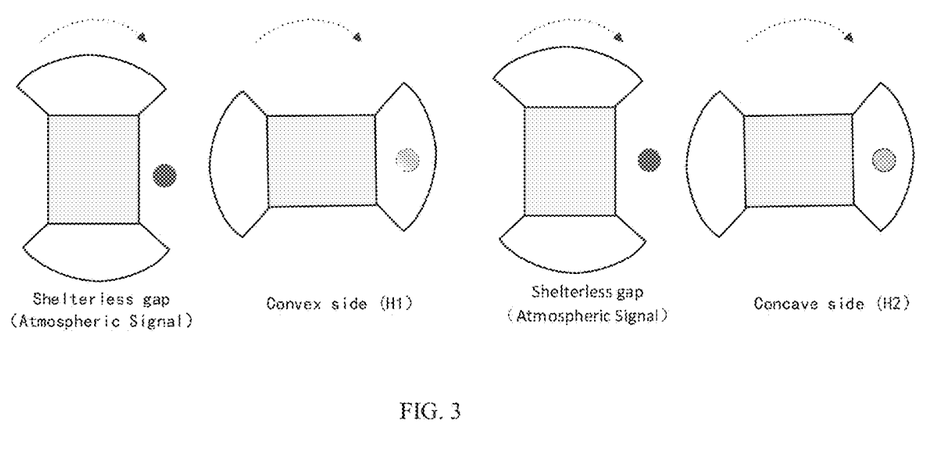
FIG. 3 is a schematic diagram of a three-phase chopper wheel C that periodically rotates to release/shelter an atmospheric signal, reflect a signal emitted by a first high-temperature blackbody calibration source H1, and reflect a signal emitted by a second high-temperature blackbody calibration source H2 according to the present disclosure.

The antenna and calibrator assembly includes the pitch scanning metal mirror M1, the first turning metal mirror M2, the second turning metal mirror M3, the three-phase chopper wheel C, the first high-temperature blackbody calibration source H1, the second high-temperature blackbody calibration source H2, and the omnidirectional rotating mechanism AzR. When the pitch scanning metal mirror M1 rotates to a certain pitch angle (such as an pitch angle of 50°), an atmospheric vapor signal at the pitch angle is reflected by the pitch scanning metal mirror M1 and horizontally transmitted to the first turning metal mirror M2. The atmospheric vapor signal is horizontally turned at 900 by the first turning metal mirror M2 and transmitted to the second turning metal mirror M3. The atmospheric vapor signal is vertically turned by the second turning metal mirror M3 and transmitted to the receiver assembly. The three-phase chopper wheel C forms a calibration unit with the first high-temperature blackbody calibration source H1 and the second high-temperature blackbody calibration source H2 to calibrate a radiation temperature of the input atmospheric signal. As shown in FIG. 2, the three-phase chopper wheel C adopts a 90° fan-shaped double-blade structure. Two fan-shaped blades turns radiation signals of the first high-temperature blackbody calibration source H1 and the second high-temperature blackbody calibration source H2 in different input directions into horizontal signals, through a conical male section and a conical female section, to be transmitted to the second turning metal mirror M3. As shown in FIG. 3, the three-phase chopper wheel C rotates periodically to switch between the input atmospheric signal (shelterless), the signal of the first high-temperature blackbody calibration source H1 (reflected by one blade of the three-phase chopper wheel C), the input atmospheric signal (shelterless), and the signal of the second high-temperature blackbody calibration source H2 (reflected by the other blade of the three-phase chopper wheel C). The input signal is vertically reflected by the second turning metal mirror M3 to the receiver assembly. The three-phase chopper wheel C switches the atmospheric signal, the signal of the first high-temperature blackbody calibration source H1, the atmospheric signal, and the signal of the second high-temperature blackbody calibration source H2 in one rotating cycle at a chopping frequency of 5-10 Hz (signal switching frequency), such that the input signal is transmitted to the receiver assembly for reception and processing. The omnidirectional rotating mechanism AzR (such as a rotating motor) is fixed on a bottom surface of a platform of the antenna and calibrator assembly, and is located directly below the second turning metal mirror M3. A rotation axis of the omnidirectional rotating mechanism AzR coincides with an optical axis of the second turning metal mirror M3. When the three-phase chopper wheel C switches the atmospheric signal, the signal of the first high-temperature blackbody calibration source H1, and the signal of the second high-temperature blackbody calibration source H2, the omnidirectional rotating mechanism AzR periodically rotates 360° with a rotation period of 1-2 min to conduct omnidirectional scanning detection of the atmospheric radiation signal at a set pitch position.

The receiver assembly includes the SIS mixer, the local oscillator, the LNA, and the 4K Dewar. The SIS mixer is a highly-sensitive superheterodyne receiver operating in a low-temperature vacuum environment provided by the 4K Dewar, with an operating frequency band of 183 GHz. The local oscillator uses a microwave reference source as a reference source and generates a millimeter wave reference source in a frequency band of 183 GHz through multiple frequency multiplication amplifications. The LNA adopts an ultra-wideband high electron mobility transistor (HEMT) amplifier. The SIS mixer, which is in a superconducting state in a 4K operating environment, receives the signal input by the antenna and calibrator assembly with high sensitivity, and mixes the signal with the local oscillator in the frequency band of 183 GHz to generate an IF signal. The IF signal is amplified by the low-temperature low-noise HEMT amplifier and output to the room temperature IF assembly. Due to the large bandwidth of the 183 GHz atmospheric vapor radiation profile measured by the system, the reception and processing of the water vapor profile are effectively achieved. The bandwidth of the SIS mixer and the IF bandwidth of the low-temperature LNA need to have ultra-wideband characteristics (8 GHz bandwidth).

The room temperature IF assembly includes a power splitter and four IF processing units with different center frequency and bandwidth combinations. The power splitter receives and splits the low-noise ultra-wideband signal (8 GHz bandwidth) output by the receiver assembly into four signals through power averaging. These four signals are output to the four IF processing units with different center frequency and bandwidth combinations for band pass filtering, detection, and DC amplification, so as to form and output four DC voltage signals to the data acquisition and system control assembly. In order to effectively process the radiation characteristic of the atmospheric vapor profile in the frequency band of 183 GHz, based on the characteristic of the atmospheric vapor profile, the mixed water vapor profile signal is subjected to detection processing with different bandwidths, including 1.5 GHz (center frequency 1.25 GHz), 1.5 GHz (center frequency 3.25 GHz), 2 GHz (center frequency 5.5 GHz), and 1.5 GHz (center frequency 7.25 GHz), thereby effectively measuring the radiation characteristic of the atmospheric vapor at different radiation temperatures.

The data acquisition and system control assembly includes a data acquisitor, an embedded controller, and application software. The data acquisitor includes four highly dynamic ADC chips, which acquire and convert the DC voltage signals (corresponding to the power of the IF signal) output from the four IF detection channels of the room temperature IF assembly, forming a digital voltage signal for subsequent processing by the application software in the embedded controller. The embedded controller is a miniaturized intelligent single-board computer with a simplified operating system. The application software running on the embedded controller is configured to set and control the overall parameters of the system, including the pitch scanning of the antenna and calibrator assembly, the pitch scanning of the metal mirror M1, the chopping start/stop and chopping rate of the three-phase chopper wheel C, the start and omnidirectional scanning rate of the omnidirectional rotating mechanism AzR, the frequency and power of the local oscillator in the receiver assembly, the bias of the SIS mixer, the bias of the LNA, the refrigeration start of the 4K Dewar, and the start/stop of the data acquisition (data acquisitor) of the data acquisition and system control assembly.

In summary, the data acquisition and system control assembly sets the working parameters of the other three assemblies and controls the start/stop of the other three assemblies. The antenna and calibrator assembly reflects the atmospheric signal in a certain pitch direction to the receiver assembly for reception by the superconducting receiver. The antenna and calibrator assembly is provided with two actively heated high-temperature blackbody calibration sources, which calibrate the radiation temperature of the short-term atmospheric signal through the rotation switching of the chopper wheel. Meanwhile, the omnidirectional rotating mechanism periodically rotates 360° to conduct omnidirectional scanning of the atmospheric signal in the pitch direction. The receiver assembly receives, with high sensitivity, the atmospheric signal input by the antenna and calibrator assembly or the high-temperature blackbody calibration signals. The built-in local oscillator converts the signal to a baseband frequency band of 8 GHz through bilateral band down conversion for further processing by the room temperature IF assembly. The room temperature IF assembly receives and splits the baseband 8 GHz signal output by the receiver assembly into four passband signals with different bandwidths. IF power detection is performed to output DC voltage signals for data acquisition by the data acquisition and system control assembly. The data acquisition and system control assembly receives the IF detection DC voltage signals output by the room temperature IF assembly, and performs data acquisition and analog-to-digital conversion to form a digital signal for processing by the application software of the assembly. In addition, classification, marking, and data file saving are performed based on scanning azimuth and pitch information, the atmospheric signal, the signal emitted by the first high-temperature blackbody calibration source H1, and the signal emitted by the second high-temperature blackbody calibration source H2. In this way, the omnidirectional scanning, reception, down conversion, data acquisition, and radiation temperature calibration of the atmospheric vapor signal are completed, thereby achieving omnidirectional measurement of the radiation characteristic of the atmospheric vapor signal.

In this embodiment, in order to ensure the synchronization of the data acquisition signal in the data acquisition and system control assembly with the chopper signal in the antenna and calibrator assembly, it is necessary to connect a status signal of the three-phase chopper wheel C to the data acquisition and system control assembly. This facilitates a distinguishing task when processing is performed by the application software in the data acquisition and system control assembly.

In this embodiment, to ensure that the acquired data is synchronized with the observed azimuth, it is necessary to synchronize the azimuth information of the azimuth scanning structure in the antenna and calibrator assembly to the data acquisition and system control assembly.

In this embodiment, the application software of the data acquisition and system control assembly extracts the status signal of the three-phase chopper wheel C in the antenna and calibrator assembly and corresponding acquisition data, and calibrates the observed atmospheric vapor radiation spectrum in the frequency band of 183 GHz based on the two high-temperature blackbody calibration sources. In addition, it also processes and forms an omnidirectional atmospheric vapor radiation characteristic map at a certain pitch angle based on the azimuth and pitch information, thereby completing fast, high-precision, and omnidirectional scanning measurement of the time-varying characteristic of atmospheric vapor radiation.

The above described are only preferred implementations of the present disclosure, and the scope of the present disclosure is not limited thereto. All technical solutions based on the idea of the present disclosure should fall within the protection scope of the present disclosure. It should be noted that several modifications and adaptations made by those of ordinary skill in the art without departing from the principle of the present disclosure should fall within the scope of protection of the present disclosure.

What is claimed is:

1. An omnidirectional measurement system for a time-varying characteristic of atmospheric vapor radiation, comprising an antenna and calibrator assembly, a receiver assembly, a room temperature intermediate-frequency (IF) assembly, and a data acquisition and system control assembly, wherein the antenna and calibrator assembly comprises a platform; a bottom surface of the platform is provided with an omnidirectional rotating mechanism AzR, and a top surface of the platform is provided with a pitch scanning metal mirror, a first turning metal mirror, a second turning metal mirror, and a calibration unit; the omnidirectional rotating mechanism AzR is configured to rotate the entire platform, such that the pitch scanning metal mirror receives atmospheric signals within different ranges; and a connection relationship between the components located on the top surface of the platform is as follows: the pitch scanning metal mirror adjusts a pitch angle through a hydraulic mechanism, and receives and reflects the atmospheric signal to the first turning metal mirror, and the first turning metal mirror adjusts a turning angle through a hydraulic mechanism, and receives and reflects the atmospheric signal reflected by the pitch scanning metal mirror to the second turning metal mirror;

the calibration unit is configured to calibrate a radiation temperature of the input atmospheric signal; the calibration unit comprises a three-phase chopper wheel, a first high-temperature blackbody calibration source and a second high-temperature blackbody calibration source, wherein the three-phase chopper wheel, the first high-temperature blackbody calibration source and the second high-temperature blackbody calibration source are located between reflection paths of the first turning metal mirror and the second turning metal mirror; the three-phase chopper wheel periodically rotates to periodically release the atmospheric signal reflected by the first turning metal mirror to the second turning metal mirror, periodically reflect a signal emitted by the first high-temperature blackbody calibration source to the second turning metal mirror, and periodically reflect a signal emitted by the second high-temperature blackbody calibration source to the second turning metal mirror; and the second turning metal mirror reflects the received atmospheric signal, the signal emitted by the first high-temperature blackbody calibration source, and the signal emitted by the second high-temperature blackbody calibration source to the receiver assembly;

the receiver assembly is configured to process each signal reflected by the second turning metal mirror, comprising mixing the signal to an intermediate frequency and performing an ultra-wideband low-noise amplification to output an ultra-wideband IF signal;

the room temperature IF assembly is configured to process the ultra-wideband IF signal output by the receiver assembly, comprising splitting the ultra-wideband IF signal into multiple channels, and performing filtering, detection, and a direct-current (DC) amplification at different bandwidths to form and output multiple DC detection signals, thereby completing a characteristic measurement of atmospheric vapor radiation; and the data acquisition and system control assembly is configured to acquire the signals output by the room temperature IF assembly, and coordinate and control various components in the antenna and calibrator assembly, the receiver assembly and the room temperature IF assembly.

2. The omnidirectional measurement system for the time-varying characteristic of atmospheric vapor radiation according to claim 1, wherein the three-phase chopper wheel comprises a main rectangular plate; two ends of the main rectangular plate are respectively fixedly provided with two fan-shaped blades; the two fan-shaped blades are provided with a conical male section and a conical female section, respectively, wherein the conical male section is provided with a convex surface, and the conical female section is provided with a concave surface.

3. The omnidirectional measurement system for the time-varying characteristic of atmospheric vapor radiation according to claim 2, wherein the three-phase chopper wheel periodically rotates to periodically release the atmospheric signal reflected by the first turning metal mirror to the second turning metal mirror, periodically reflect the signal emitted by the first high-temperature blackbody calibration source to the second turning metal mirror, and periodically reflect the signal emitted by the second high-temperature blackbody calibration source to the second turning metal mirror as follows:

the main rectangular plate in the three-phase chopper wheel rotates around a center point; when the main rectangular plate rotates to shelter the atmospheric signal reflected by the first turning metal mirror, the fan-shaped blades provided at the ends of the main rectangular plate correspondingly rotate to designated positions, and the first high-temperature blackbody calibration source and the second high-temperature blackbody calibration source emit signals; if the fan-shaped blade shows the conical male section, the signal emitted by the first high-temperature blackbody calibration source is adapted with a fitting angle of the conical male section, and is successfully reflected to the second turning metal mirror, while the signal emitted by the second high-temperature blackbody calibration source is not adapted with the fitting angle of the conical male section, and is not reflected to the second turning metal mirror; if the fan-shaped blade shows the conical female section, the signal emitted by the second high-temperature blackbody calibration source is adapted with a fitting angle of the conical female section, and is successfully reflected to the second turning metal mirror, while the signal emitted by the first high-temperature blackbody calibration source is not adapted with the fitting angle of the conical female section, and is not reflected to the second turning metal mirror;

when the main rectangular plate rotates to not shelter the atmospheric signal reflected by the first turning metal mirror, the fan-shaped blades provided at the ends of the main rectangular plate detach from the designated positions, and the signals emitted by the first high-temperature blackbody calibration source and the second high-temperature blackbody calibration source are not reflected to the second turning metal mirror; and in this way, the three-phase chopper wheel rotates periodically, so as to periodically release the atmospheric signal reflected by the first turning metal mirror to the second turning metal mirror, periodically reflect the signal emitted by the first high-temperature blackbody calibration source to the second turning metal mirror, and periodically reflect the signal emitted by the second high-temperature blackbody calibration source to the second turning metal mirror.

4. The omnidirectional measurement system for the time-varying characteristic of atmospheric vapor radiation according to claim 1, wherein the receiver assembly comprises a superconductor-insulator-superconductor (SIS) mixer, a low-noise amplifier (LNA), a local oscillator, and a 4K Dewar; the SIS mixer and the LNA are located in a low-temperature vacuum environment provided by the 4K Dewar; the local oscillator uses a microwave reference source as a reference source, and generates a millimeter wave reference source in a certain frequency band through multiple frequency multiplication amplifications; the SIS mixer is configured to mix the signal transmitted by the second turning metal mirror with the local oscillator in the frequency band to generate an IF signal; and the IF signal is amplified by the LNA at a low temperature and output to the room temperature IF assembly.

5. The omnidirectional measurement system for the time-varying characteristic of atmospheric vapor radiation according to claim 4, wherein the room temperature IF assembly comprises a power splitter and four IF processing units with different center frequency and bandwidth combinations; the IF processing unit comprises a band pass filter, a detector, and a DC amplifier; the power splitter is configured to receive the signal output by the LNA and split the signal into four signals, through power averaging, to the IF processing units; and the band pass filter, the detector and the DC amplifier inside each of the IF processing units sequentially process the input signal to finally form four DC voltage signals to complete the characteristic measurement of atmospheric vapor radiation, and the four DC voltage signals are output to the data acquisition and system control assembly.

6. The omnidirectional measurement system for the time-varying characteristic of atmospheric vapor radiation according to claim 5, wherein the data acquisition and system control assembly comprises a data acquisitor composed of four highly dynamic analog-to-digital converter (ADC) chips and an embedded controller; each of the ADC chips is correspondingly connected to one IF processing unit to acquire and convert data information processed by each IF processing unit, for subsequent analysis by the embedded controller; and the embedded controller is further configured to adjust parameters of various system devices, comprising a pitch scanning angle of the pitch scanning metal mirror, a reflection angle of the first turning metal mirror, a reflection angle of the second turning metal mirror, chopping start/stop and a chopping rate of the three-phase chopper wheel, start and an omnidirectional scanning rate of the omnidirectional rotating mechanism AzR, a frequency and power of the local oscillator, a bias of the SIS mixer, a bias of the LNA, refrigeration start of the 4K Dewar, and start/stop of four-channel data acquisition.

* * * * *